US009443282B2

(12) United States Patent
Hoshino et al.

(10) Patent No.: US 9,443,282 B2
(45) Date of Patent: Sep. 13, 2016

(54) IMAGE PROCESSING CIRCUIT AND SEMICONDUCTOR INTEGRATED CIRCUIT

(71) Applicant: Panasonic Corporation, Osaka (JP)

(72) Inventors: Masashi Hoshino, Osaka (JP); Masaaki Harada, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 218 days.

(21) Appl. No.: 14/365,349

(22) PCT Filed: Nov. 30, 2012

(86) PCT No.: PCT/JP2012/007711
§ 371 (c)(1),
(2) Date: Jun. 13, 2014

(87) PCT Pub. No.: WO2013/088664
PCT Pub. Date: Jun. 20, 2013

(65) Prior Publication Data

US 2014/0347374 A1 Nov. 27, 2014

(30) Foreign Application Priority Data

Dec. 15, 2011 (JP) ................................ 2011-274303

(51) Int. Cl.
*G06T 1/20* (2006.01)
*G06F 9/28* (2006.01)
*G06F 1/32* (2006.01)

(52) U.S. Cl.
CPC ............... *G06T 1/20* (2013.01); *G06F 1/3237* (2013.01); *G06F 9/28* (2013.01); *G06T 2200/28* (2013.01); *Y02B 60/1221* (2013.01)

(58) Field of Classification Search
CPC ... G06T 1/20; G06T 2200/28; G06F 1/3237; G06F 9/28; Y02B 60/1221
USPC .......................................................... 345/506
See application file for complete search history.

(56) References Cited

U.S. PATENT DOCUMENTS

2005/0050372 A1 3/2005 Hagiwara
2006/0045182 A1 * 3/2006 Yokose ................ H04N 19/197
375/240.12

(Continued)

FOREIGN PATENT DOCUMENTS

JP 05-189990 A 7/1993
JP 07-262002 A 10/1995

(Continued)

OTHER PUBLICATIONS

International Search Report for Application No. PCT/JP2012/007711 dated Feb. 12, 2013.

*Primary Examiner* — Ke Xiao
*Assistant Examiner* — Kim-Thanh T Tran
(74) *Attorney, Agent, or Firm* — Pearne & Gordon LLP

(57) ABSTRACT

This image processing circuit performs, with reduced power consumption, pipeline processing of image data. This image processing circuit has an image processing unit which performs pipeline processing of image data having N-bit pixel data. The image processing unit has a pipeline register (400) having upper bit flip-flop circuits (401), lower-order bit flip-flop circuits (402), a comparison circuit (403) which determines whether the input values and the output values of the upper bit flip-flop circuits (401) are the same, and a clock gating control circuit (404) which controls supply of the clock signal such that, when the aforementioned input and output values are the same, the clock signal is not supplied to the upper bit flip-flop circuits (401). The pipeline register (400) does not have a circuit for controlling supply of the clock signal to the lower 1-bit flip-flop circuits (402), and holds pixel data or calculation results during pipeline processing.

6 Claims, 12 Drawing Sheets

(56) References Cited

U.S. PATENT DOCUMENTS

| | | | | |
|---|---|---|---|---|
| 2007/0009060 | A1* | 1/2007 | Lavelle ..................... | G06F 3/14 375/295 |
| 2008/0263228 | A1* | 10/2008 | Kawasaki ............. | G06F 9/3001 710/1 |

FOREIGN PATENT DOCUMENTS

| | | | |
|---|---|---|---|
| JP | 2005-078518 | A | 3/2005 |
| JP | 2006-345278 | A | 12/2006 |
| JP | 2008-134926 | A | 6/2008 |
| JP | 2009-187075 | A | 8/2009 |

* cited by examiner

IMAGE PROCESSING CIRCUIT AND SEMICONDUCTOR INTEGRATED CIRCUIT

TECHNICAL FIELD

The present invention relates to an image processing circuit and a semiconductor integrated circuit that include a pipeline register and perform image processing on image data by pipeline processing.

BACKGROUND ART

Color image data or the like is image data formed of pixel data of N bits (N is an integer equal to or greater than two). As image processing on such image data, data conversion processing is widely performed for image quality improvement, expansion, reduction and the like. The image data is normally pixel value data acquired by scanning the image for every pixel line. As a method for realizing high-speed processing, pipeline processing (parallel processing) is used for the data conversion processing (image processing) on such image data. In this pipeline processing, many pipeline registers are used.

The pipeline register used for the image processing normally has a plurality of flip-flop circuits which are provided per bit of the image data. The plurality of flip-flop circuits are supplied with a common clock signal for their operation and hold the image data.

However, in the pipeline processing, as the content of the image processing becomes more complicated, the number of required flip-flop circuits increases. As a result, the power consumption in the switching operation of each flip-flop circuit increases. Especially, since portable electronic devices such as a digital camera and a portable information terminal are mainly battery-powered, it is desirable to perform image processing with as low power consumption as possible.

Therefore, in order to achieve an image processing circuit with low power consumption, applying the technology disclosed in PTL 1 to the flip-flop circuits of an image processing circuit is a possible solution.

The technology disclosed in PTL 1 (hereinafter "related art") provides a synchronization register that receives, as input, higher order 8 bits of 16-bit input data. Moreover, the related art provides a synchronization register that receives, as input, lower-order 8 bits of the 16-bit input data. Further, the related art provides a comparison circuit and a clock gating control circuit for every synchronization register.

The comparison circuit determines whether the input value and output value (both are 8 bits) of the synchronization register are the same. When it is determined that the input value and the output value are the same, the clock gating control circuit controls the supply of a clock signal to the synchronization register. That is, the clock gating control circuit prevents the clock signal from being supplied to the synchronization register. Moreover, even in a case where the higher order 8 bits of input data are invalid, the clock gating control circuit for the higher order 8 bits stops the supply of the clock signal to the synchronization register for the higher order 8 bits.

In a case where the input value and output value of the synchronization register are the same, since the value to be held does not change, it can be said that the switching operation of the synchronization register is a useless operation. Therefore, such a related art can reduce the useless switching operation of the synchronization register. That is, the related art can reduce the power consumption of the synchronization register without impairing the function of the synchronization register.

In a case where the input value and output value of a flip-flop circuit in an image processing circuit are the same, it can be said that the switching operation is a useless operation. Therefore, applying the related art to each flip-flop circuit of the image processing circuit allows the image processing circuit to attempt a reduction in the power consumption.

CITATION LIST

Patent Literature

PTL1
Japanese Patent Application Laid-Open No. 2008-134926

SUMMARY OF INVENTION

Technical Problem

However, there is a problem of difficulty in actually reducing the power consumption in an image processing circuit even if the related art is applied because of the following reasons.

In the case of image data (especially, image data with a large number of colors), all values of multiple bits of the same value are less likely to be consecutive, so that the supply of a clock signal is hardly stopped. Moreover, to avoid this, it is possible to provide a comparison circuit and a clock gating control circuit for every bit. However, in this case, the number of comparison circuits increases. Moreover, in the case of image data, since there are only few cases where a partial bit range can be treated as invalidity, there is less chance to stop the clock signal supply corresponding to the invalid bit.

An object of the present invention is to provide an image processing circuit and a semiconductor integrated circuit that can perform pipeline processing on image data with reduced power consumption.

Solution to Problem

An image processing circuit according to this disclosure includes: an input section that receives, as input, image data having pixel data of N bits (N is an integer equal to or greater than two); an image processing section that performs pipeline processing on the image data based on a clock signal; and an output section that outputs data acquired by the pipeline processing, in which the image processing section includes a pipeline register, in which the pipeline register includes: a higher-order n-bit register that receives, as input, data of higher-order n-bits of held data; a lower-order 1-bit register that receives, as input, lower-order 1-bit data of the held data; a comparison circuit that determines whether an input value of the higher-order n-bit register and an output value of the higher-order n-bit register are identical; and a clock gating control circuit that controls supply of the clock signal to the higher-order n-bit register such that the clock signal is not supplied to the higher-order n-bit register when the comparison circuit determines that the input value and the output value are identical, in which the pipeline register comprises no circuit which controls the supply of the clock signal to the lower-order 1-bit register and holds image data or an operation result in the course of pipeline processing.

Advantageous Effects of Invention

According to the present disclosure, it is possible to perform pipeline processing on image data with reduced power consumption.

DESCRIPTION OF EMBODIMENTS

In the following, each embodiment of the present invention is described in detail with reference to the drawings.

Embodiment 1

In the following, an explanation about an image processing circuit according to Embodiment 1 of the present invention is given in order from the overall configuration to specific configurations.

<Overall Configuration of Image Processing Circuit>

First, the overall configuration of the image processing circuit is described.

Figure 1:
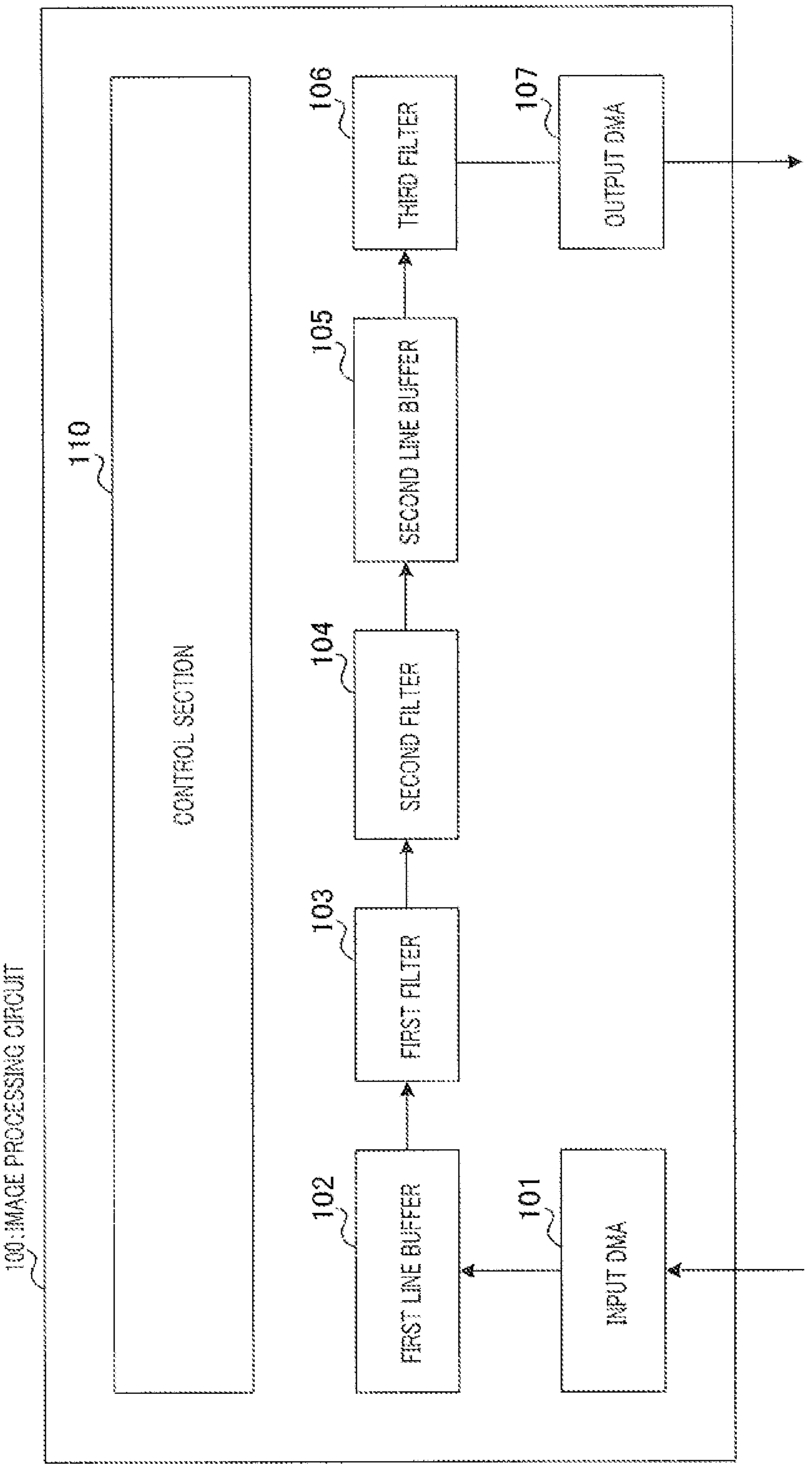
FIG. 1 is a configuration diagram illustrating an example of a configuration of an image processing circuit according to Embodiment 1 of the present invention.

FIG. 1 is a configuration illustrating an example of a configuration of the image processing circuit according to the present embodiment.

In FIG. 1, image processing circuit 100 is an apparatus that reads and receives image data from an external memory (not illustrated) and performs various kinds of conversion processing (image processing) on the input image data. For example, image processing circuit 100 is mounted on a semiconductor integrated circuit in a digital camera or a portable information terminal.

Here, in the present embodiment, it is assumed that image data input to image processing circuit 100 is image data having pixel data of N bits (N is an integer equal to or greater than two). Moreover, in a case where the upper left position is assumed to be the origin of coordinates, the image data input to image processing circuit 100 is data of the pixel value to be acquired by raster scanning in the horizontal direction in order from the upper left position for every pixel line of the image. When performing conversion processing on a per frame basis, for example, image processing circuit 100 repeats the processing for every scanning line in order of the raster scanning.

Image processing circuit 100 includes input DMA (Direct Memory Access) 101, first line buffer 102, first filter 103, second filter 104, second line buffer 105, third filter 106, output DMA 107 and control section 110. Here, in the present embodiment, an explanation is given with an assumption that the image processing section includes first filter 103, second filter 104 and third filter 106. However, the configuration of the image processing section is not limited to this configuration. Any image processor can be used as long as the image processor is configured to apply various kinds of pipeline conversion processing (image processing) on image data.

Input DMA 101 is a DMA circuit which becomes an input circuit to receive image data. To be more specific, input DMA 101 sequentially reads the image data on a per pixel line basis from a predetermined frame buffer area of an external memory (not illustrated) (read transfer). Further, input DMA 101 transfers the read image data of each pixel line (which is referred to as "line data" below) to first line buffer 102.

First line buffer 102 temporarily stores the line data transferred from input DMA 101. First line buffer 102 stores at least line data for the number of lines required for processing in first filter 103, which follows first line buffer 102. For example, in a case where consecutive data of four lines in the vertical direction is required for the processing in first filter 103, first line buffer 102 has a buffer area capable of storing the line data for four lines or more.

First filter 103 receives each line data stored in first line buffer 102. Further, first filter 103 performs pipeline processing (image processing) on the input line data in synchronization with a clock signal.

To be more specific, first filter 103 is a filter circuit which performs predetermined conversion processing such as noise removal processing on the input line data. First filter 103 reads and receives the line data for a required number of lines (that is, for a required pixel number in the vertical direction of an image) from first line buffer 102 at the same timing. At this time, first filter 103 sequentially receives data on a per pixel basis in the direction from the left edge pixel of the image to the right edge pixel such that data of the same pixel position is input between multiple items of line data at the same timing. Here, the same pixel position indicates that the position in the horizontal direction of the image is identical.

Further, first filter 103 outputs line data acquired as a result of the image processing to second filter 104.

Second filter 104 performs pipeline processing on each line data input from first filter 103 in synchronization with the clock signal. To be more specific, second filter 104 is a filter circuit which performs predetermined conversion processing such as edge enhancement filter processing on the input line data. Further, second filter 104 outputs line data acquired as a result of the image processing to second line buffer 105.

Second line buffer 105 temporarily stores each line data received from second filter 104. Second line buffer 105 stores at least line data for the number of lines required for processing in third filter 106, which follows second buffer 105.

Third filter 106 receives each line data stored in second line buffer 105 and performs pipeline processing on the received line data in synchronization with the clock signal. To be more specific, third filter 106 is a filter circuit which performs predetermined conversion processing on the received line data. This predetermined conversion processing is, for example, color space conversion processing from the YUV system to the RGB system or in the opposite direction. Third filter 106 reads and receives the line data for a required number of lines (that is, for a required number of pixels in the vertical direction of the image) from second line buffer 105 at the same timing.

Further, third filter 106 outputs line data acquired as a result of the image processing to output DMA 107.

Output DMA 107 is a DMA circuit which is an output section to output the image data. Output DMA 107 writes each line data received from third filter 106 in a frame buffer area of an external memory in the order of received data (write transfer).

Control section 110 controls input DMA 101 to output DMA 107 according to a set parameter such that image data for one frame is processed on a per pixel line basis in the horizontal direction in order from the upper left edge. Here, in order to control details of the pipeline processing operation, control section 110 may be configured to additionally include a (unillustrated) controller in each line buffer and filter of first line buffer 102 to third filter 106.

In the above-mentioned configuration, first line buffer 102 to third filter 106 form the image processing section which performs pipeline processing on image data in synchronization with a clock signal. However, as mentioned below, this image processing section has a configuration that allows image processing with reduced power consumption. Moreover, individual filters, a data path described below or each pipeline register may be interpreted as an image processor which performs the pipeline processing on the image data on the basis of a clock signal.

<Overall Configuration of Filter Circuit>

Next, the overall configurations of first to third filters 103, 104 and 106 are described.

In the present embodiment, first to third filters 103, 104 and 106 may employ any configuration as long as the configuration allows the filters to perform pipeline processing on image data, and the configuration is not limited to any specific configuration. Therefore, the common part of the configurations of first to third filters 103, 104 and 106 is referred to as "filter 200." and the configuration of filter 200 is described.

Figure 2:
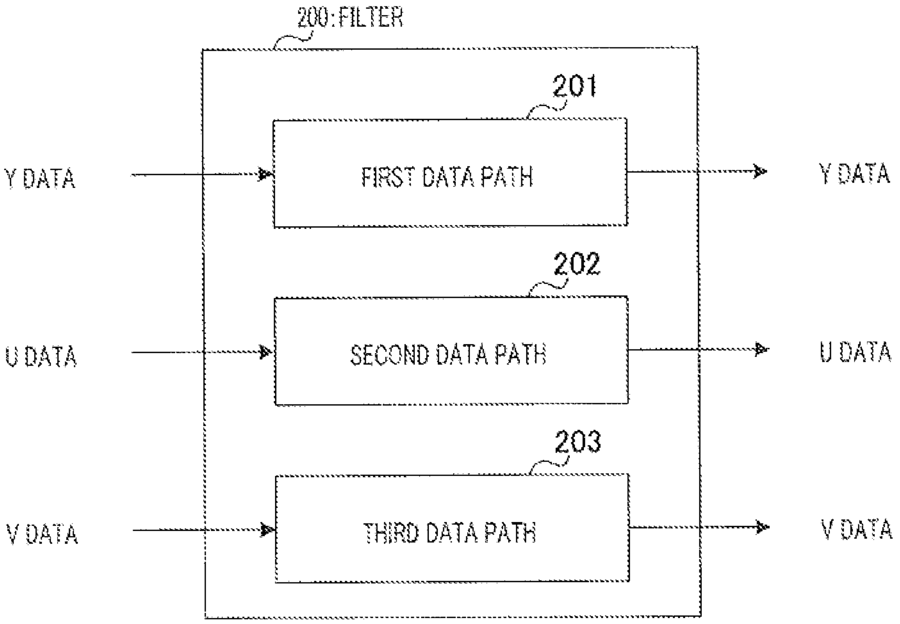
FIG. 2 is a configuration diagram illustrating an example of a filter configuration according to Embodiment 1.

FIG. 2 is a configuration diagram illustrating an example of the configuration of filter 200 in a case where input line data (image data) is in the YUV format.

As illustrated in FIG. 2, for example, filter 200 has first to third data paths 201 to 203. First to third data paths 201 to 203 are a data path for the Y component, a data path for the U component and a data path for the V component in this order.

Each line data input to filter 200 is separated into the Y component, the U component and the V component. Further, each separated component is input to the corresponding one of first to third data paths 201 to 203 and subjected to conversion processing.

First to third data paths 201 to 203 perform pipeline processing with the same pipeline stage number and output data of the same pixel position at the same timing. Each calculator configuration of first to third data paths 201 to 203 depends on the content of conversion processing to be performed by filter 200. Moreover, the presence or absence of connection between first to third data paths 201 to 203 and the configurations also depend on the content of the conversion processing to be performed by filter 200. For example, processing in which the halfway operation result of the Y component is used for operation processing of the U component may be performed. In this case, for example, the halfway operation result in first data path 201 is given as an input of a desired pipeline position of second data path 202.

Here, even in a case where line data is in the RGB format, similarly, a configuration is provided in which the data path of each color component is separated and arranged. On the other hand, the configuration becomes a little different in a case where filter 200 performs conversion processing from the YUV format to the RGB format on line data.

Figure 3:
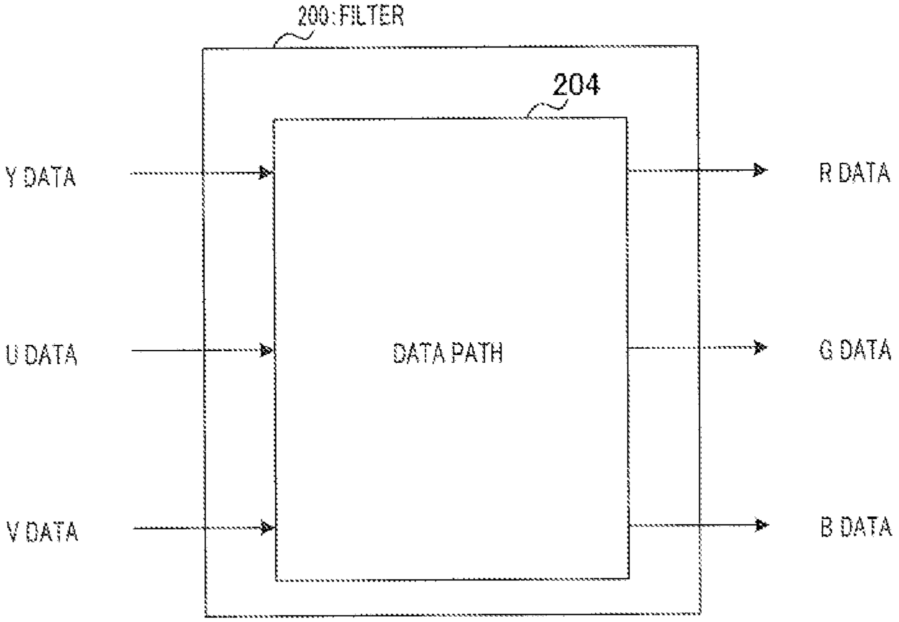
FIG. 3 is a configuration diagram illustrating another example of a filter configuration according to Embodiment 1.

FIG. 3 is a configuration diagram illustrating an example of the configuration of filter 200 in a case where filter 200 performs conversion from the YUV format to the RGB format.

As illustrated in FIG. 3, for example, filter 200 has data path 204 in which each color component is not separated. Data path 204 performs operation processing between data of the Y component, the U component and the V component.

<Internal Configuration of Data Path>

Next, the configurations of first to third data paths 201 to 203 and data path 204 in filter 200 are described.

In the present embodiment, first to third data paths 201 to 203 and data path 204 may employ any configuration as long as the configuration allows the data paths to perform conversion processing by pipeline processing, and the configuration is not limited to any specific configuration. Therefore, the common part of the configurations of first to third data paths 201 to 203 and data path 204 is referred to as "data path 300." In the following, the configuration of data path 300 is described.

Moreover, in the following explanation, it is assumed that data of each color component of image data (line data) is, for example, data of 8-bit (bit) color (256 colors). Moreover, in the line data, a part corresponding to one pixel is referred to as "pixel data." That is, each color component of the pixel data is 8 bits. Further, it is assumed that data path 300 receives and processes four items of line data (line data for four pixel lines) at the same time. Here, it is assumed that data path 300 is a data path with respect to pixel data of one color component. That is, data path 300 corresponds to each data path of first to third data paths 201 to 203.

Figure 4:
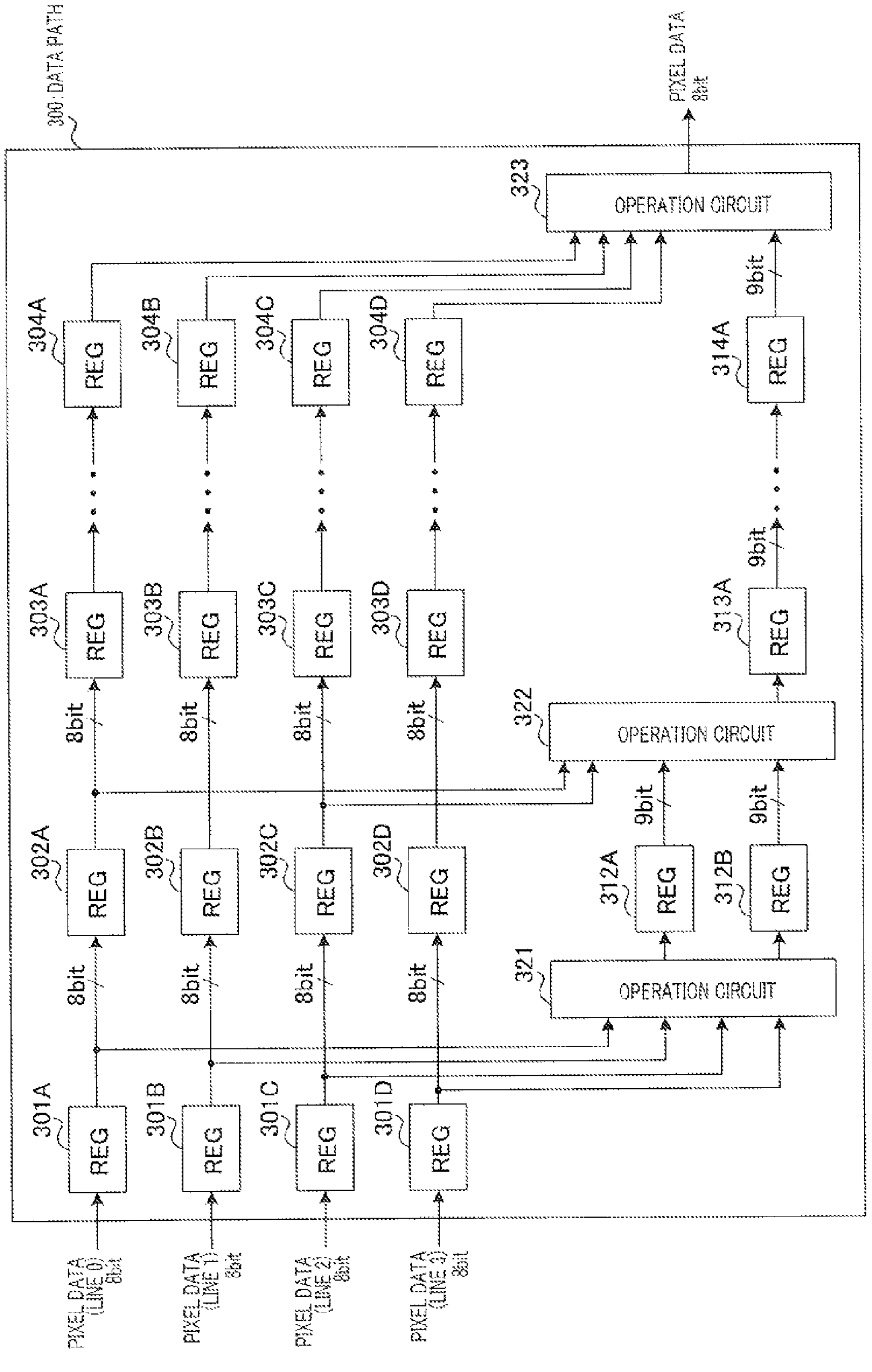
FIG. 4 is a circuit configuration diagram illustrating an example of a data path configuration according to Embodiment 1.

FIG. 4 is a circuit configuration diagram illustrating an example of the configuration of data path 300.

As illustrated in FIG. 4, data path 300 includes pipeline registers 301A to 301D, 302A to 302D, 303A to 303D, 304A to 304D, 312A and 312B, 313A and 314A and operation circuits 321 to 323.

Each of pipeline registers 301A to 304D among pipeline registers 301A to 314A is a register which holds the value of pixel data of each color component to be received. Pipeline registers 301A to 304D are respectively constituted by shift registers. Further, pipeline registers 301A to 304D output input data to an operation circuit on the corresponding pipeline stage among operation circuits 321 to 323. That is, pipeline registers 301A to 304D sequentially receive consecutive pixel data on a per line basis and sequentially hold input pixel data.

Here, pipeline registers 312A and 312B, 313A and 314A among pipeline registers 301A to 314A are registers which store the intermediate processing result of operation processing in the pipeline processing. In data path 300, each held bit number in pipeline registers 312A and 312B, 313A and 314A is, for example, 9 bits.

Operation circuits 321 to 323 are operation circuits on respective pipeline stages. Operation circuits 321 to 323 realize a desired logical operation by a combination circuit combining circuits that perform, for example, an arithmetic operation such as multiplication, addition and subtraction, and clipping processing.

Here, the configuration of data path 300 is not limited to the configuration illustrated in FIG. 4. In data path 300, pipeline registers may be disposed only on a necessary stage among pipeline stages of the image processing. Moreover, the bit number of pixel data to be received or the bit number in the intermediate processing result of an operation circuit is not limited to the above-mentioned configuration, and it may be 10 bits, 12 bits or 16 bits.

In data path 300, as the number of pixel lines increases, it requires more pipeline registers disposed in the vertical direction (that is, in parallel). In data path 300, as the number of pipeline stages increases, it requires more pipeline registers disposed in the horizontal direction (that is, in series). That is, the number of pipeline registers varies depending on the content of processing to be performed in data path 300. As the number of pipeline registers increases, the effect of reducing power consumption and the effect of avoiding an increase in circuit scale, which are described below, become more remarkable.

<Configuration of Pipeline Register>

Next, the configurations of pipeline registers 301A to 304D in data path 300 are described.

In the present embodiment, pipeline registers 301A to 314A employ any configuration as long as the configuration allows the pipeline registers to hold input data for a predetermined bit number, and the configuration is not limited to any specific configuration. Therefore, the common part of the configurations of pipeline registers 301A to 314A is referred to as "pipeline register 400." In the following, the configuration of pipeline register 400 is described.

Figure 5:
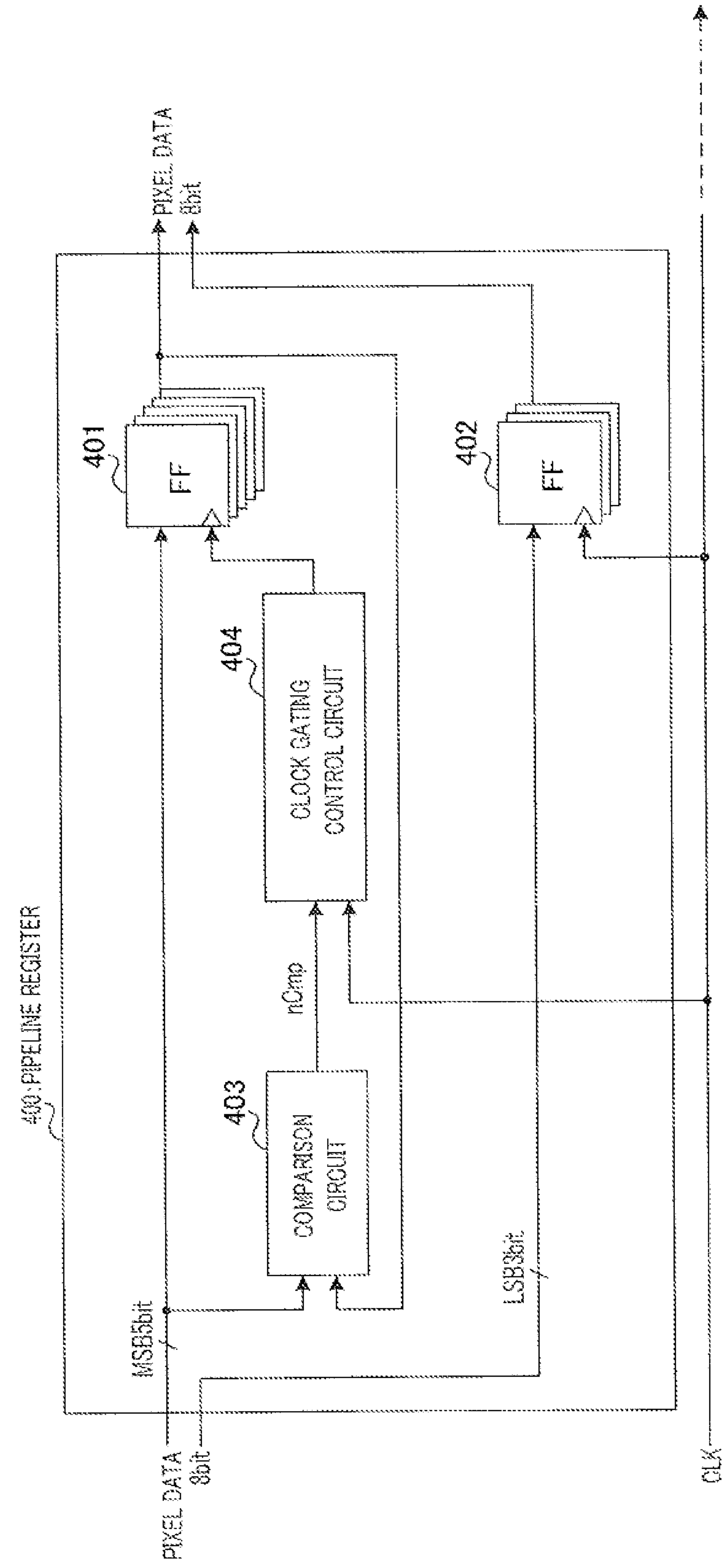
FIG. 5 is a circuit configuration diagram illustrating an example of a configuration of a pipeline register according to Embodiment 1.

FIG. 5 is a circuit configuration diagram illustrating an example of the configuration of pipeline register 400.

As illustrated in FIG. 5, pipeline register 400 has multiple higher-order bit flip-flop (FF) circuits 401, multiple lower-order bit flip-flop circuits 402, comparison circuit 403 and clock gating control circuit 404.

Higher-order bit flip-flop circuit 401 is a register for n higher-order bits which receives data of n higher-order bits of held data as input. Here, five higher-order bit flip-flop circuits 401 are installed in parallel. For example, it is assumed that five higher-order bit flip-flop circuits 401 hold 5 bits on the higher side (MSB) of pixel data of 8 bits.

Lower-order bit flip-flop circuit 402 is a register for 1 lower-order bit which receives data of 1 lower-order bit of held data as input. Here, three lower-order bit flip-flop circuits 402 are installed in parallel. For example, it is assumed that three lower-order bit flip-flop circuits 402 hold 3 bits on the lower side (LSB) of pixel data of 8 bits.

Here, higher-order bit flip-flop circuit 401 and lower-order bit flip-flop circuit 402 are normal data-entry-type flip-flop circuits. Here, although no illustration is given in particular, a reset input may be added to higher-order bit flip-flop circuit 401 and lower-order bit flip-flop circuit 402 if necessary.

Comparison circuit 403 receives an input value of 5 bits with respect to five higher-order bit flip-flop circuits 401 and an output value of 5 bits from five higher-order bit flip-flop circuits 401. In the following, the input value of 5 bits with respect to five higher-order bit flip-flop circuits 401 is referred to as "higher-order bit input value." Moreover, the output value of 5 bits from five higher-order bit flip-flop circuits 401 is referred to as "higher-order bit output value." Comparison circuit 403 compares the higher-order bit input value and the higher-order bit output value to determine whether they are the same.

Figure 6:
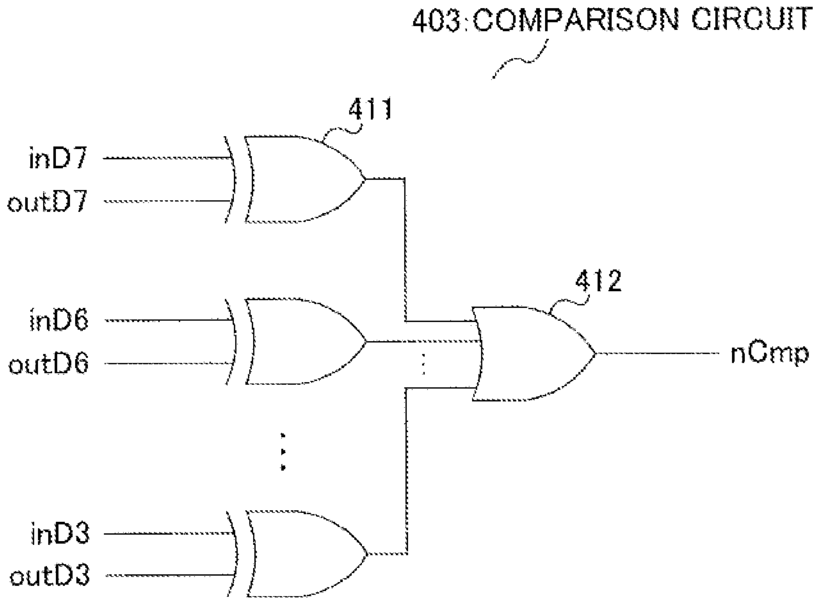
FIG. 6 is a circuit configuration diagram illustrating an example of a configuration of a comparison circuit according to Embodiment 1.

FIG. 6 is a circuit configuration diagram illustrating one example of the configuration of comparison circuit 403.

As illustrated in FIG. 6, for example, comparison circuit 403 is constituted by 5 two-input EXOR gates 411 and one five-input OR gate 412.

Comparison circuit 403 performs matching detection between higher-order bit input values inD3 to inD7 of 5 bits and higher-order bit output values outD3 to outD7 of 5 bits. Further, comparison circuit 403 outputs a detection result (nCmp). In a case where higher-order bit input values inD3 to inD7 and higher-order bit output values outD3 to outD7 completely match, comparison circuit 403 outputs a signal of "0" as a detection result (nCmp). Moreover, in a case where higher-order bit input values inD3 to inD7 and higher-order bit output values outD3 to outD7 do not match even in 1 bit, comparison circuit 403 outputs a signal of "1" as a detection result (nCmp).

When comparison circuit 403 determines that the higher-order bit input values and the higher-order bit output values are the same, clock gating control circuit 404 in FIG. 5 does not supply the next clock signal (CLK) to higher-order bit flip-flop circuit 401.

Figure 7:
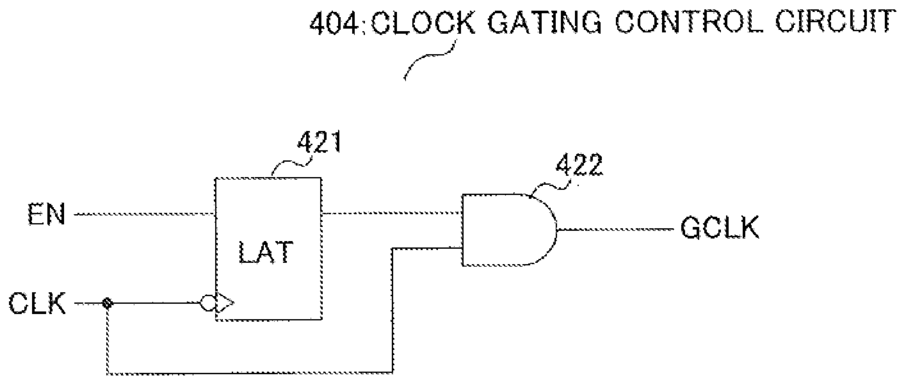
FIG. 7 is a circuit configuration diagram illustrating an example of a configuration of a clock gating control circuit according to Embodiment 1.

FIG. 7 is a circuit configuration diagram illustrating an example of the configuration of clock gating control circuit 404.

As illustrated in FIG. 7, for example, clock gating control circuit 404 is constituted by latch circuit (LAT) 421 and AND gate 422.

Latch circuit 421 latches the output (EN and detection result nCmp) of comparison circuit 403 to be received as an enable signal, on the basis of the falling edge of a clock signal (CLK) to be received from the outside (not illustrated).

AND gate 422 outputs a logical product of the output (latched value) of latch circuit 421 and the clock signal (CLK).

In a case where enable signal EN becomes 1 with respect to the clock signal (CLK) that is always supplied, clock gating control circuit 404 outputs clock GCLK. That is, clock gating control circuit 404 is a general clock gating control circuit.

Here, a circuit and operation related to a write enable control signal clock and gating control by the signal are not directly related to the content of the present disclosure and therefore individual explanation is omitted.

Figure 8:
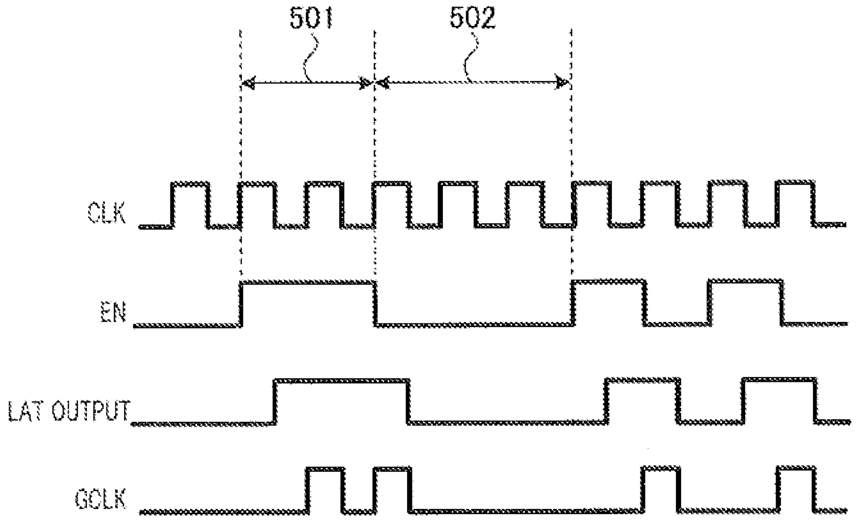
FIG. 8 illustrates an example of timing charts of input/output signals in a clock gating control circuit according to Embodiment 1.

FIG. 8 is an example of the timing charts of input/output signals of clock gating control circuit 404.

Clock gating control circuit 404 outputs the next clock signal (CLK) to segment 501 in which the output (EN) of comparison circuit 403 is "1," as a clock signal (GCLK). That is, such segment 501 is a segment in which the higher-order bit input value and the higher-order bit output value do not match.

In pipeline register 400, held pixel data is updated at the rising edge of the clock signal (CLK). When the pixel data is updated, comparison circuit 403 determines whether the input and output of pipeline register 400 match with each other. In a case where the determination result is "1," the input and the output do not match. Accordingly, in this case, clock gating control circuit 404 outputs the next clock signal (CLK) as a clock signal (GCLK). Therefore, clock gating control circuit 404 latches the output (EN) of comparison circuit 403 at the falling timing of the clock signal (CLK) in latch circuit 421.

Further, clock gating control circuit 404 can surely generate the clock signal (GCLK) by the output (LAT output) of latch circuit 421 which is a waveform shifting the output (EN) of comparison circuit 403 by a half clock.

On the other hand, clock gating control circuit 404 outputs the next clock signal (CLK) to segment 502 in which the output (EN) of comparison circuit 403 is "0," as a signal (GCLK) in which "0" continues. Such segment 502 is a segment in which the higher-order bit input value and the higher-order bit output value match. That is, such segment 502 is a segment in which the flip-flop operation of higher-order bit flip-flop circuit 401 is not necessary.

That is, while a signal indicating the determination result is "1," clock gating control circuit 404 supplies the clock signal to each of five higher-order bit flip-flop circuits 401. Further, while the signal indicating the determination result is "0," clock gating control circuit 404 blocks the supply of the clock signal to each higher-order bit flip-flop circuit 401 (gating).

This blocking is performed because, as mentioned above, the input value to each higher-order bit flip-flop circuit 401 is the same as the value (output value) that has already been held. That is, this blocking is performed because it is not necessary to write a new value. As a result, it is possible to reduce the number of switching operations in the clock input line part of higher-order bit flip-flop circuit 401 and reduce the power consumption of higher-order bit flip-flop circuit 401. Here, while the supply of the clock signal is blocked, higher-order bit flip-flop circuit 401 keeps holding the value written at the end.

Here, as illustrated in FIG. 5, pipeline register 400 directly receives the clock signal to be output from control section 110 to lower-order bit flip-flop circuit 402, without via a circuit that performs clock gating. That is, pipeline register 400 does not have a circuit that controls the supply of the clock signal to lower-order bit flip-flop circuit 402 (such as a comparison circuit and a clock gating circuit).

Here, as for pipeline registers 312A, 312B, 313A and 313B, held data becomes 9 bits. Therefore, as for the bit widths of the higher side bits and the lower side bits, for example, they may be formed such that the higher side bits that are the connection target of the comparison circuit and the clock gating control circuit are 6 bits and the excluded lower side bits are 3 bits. Thus, in the present embodiment, taking into account the bit width of data to be held by a pipeline register and the influence of a held halfway operation result to a matching frequency characteristic, it is also possible to increase and/or decrease the bit width of the higher side bits to be targeted by each pipeline register.

Processing Timing of Pipeline Processing>

Next, the waveform of each signal in pipeline register 400 is described with reference to a specific example.

Figure 9:
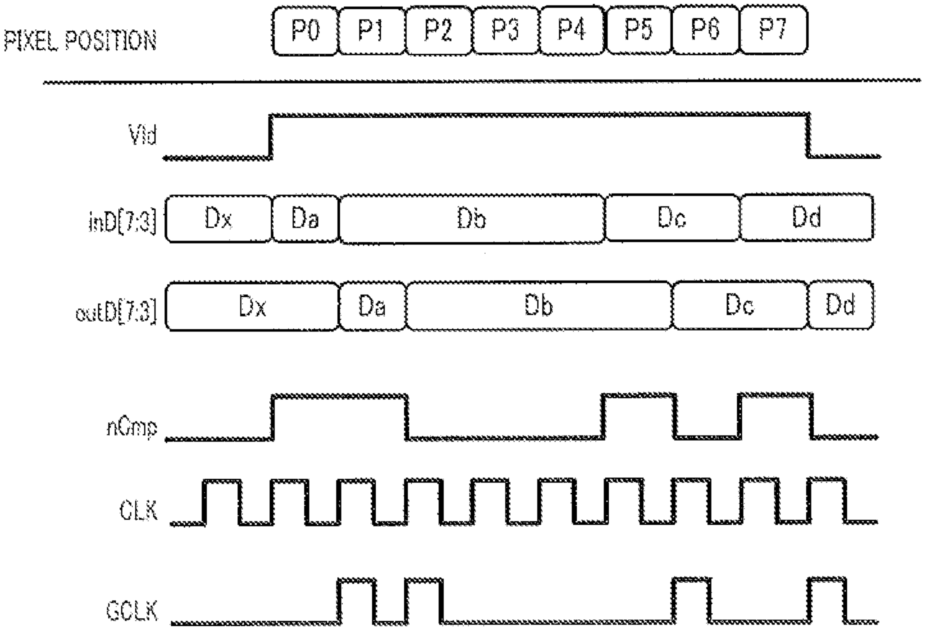
FIG. 9 illustrates an example of a timing chart of each signal in a pipeline register according to Embodiment 1.

FIG. 9 illustrates an example of the timing chart of each signal at the time of pipeline processing in pipeline register 400. In FIG. 9, the pixel position corresponding to each pixel data is additionally illustrated as a reference.

As illustrated in FIG. 9, in segments of pixel positions P0 to P7, it is assumed that control signal Vld is "1" showing that pixel data inD (including 3 bits of the lower-order bits and higher-order bit inD[7:3]) is valid. Pipeline register 400 acquires pixel data of positions (horizontal coordinates) P0 to P7 of input pixels by detecting a segment in which control signal Vld is "1."

In FIG. 9, Dx, Da and Db to Dd that are higher-order bit input value inD[7:3] and high-bit output value outD[7:3] are assumed to express respective different values. Here, higher-order bit input value inD[7:3] is higher-side 5 bits of input pixel data to pipeline register 400. Moreover, higher-order bit output value outD[7:3] is held data of pipeline register 400.

It is assumed that the value is the same as the previous adjacent pixel in the segments of pixel positions P2 to P4 and P6. In this case, as illustrated in FIG. 9, while higher-order bit input value inD[7:3] corresponds to pixel positions P2 to P4 and P6, output signal nCmp of comparison circuit 403 is "0." As a result, as illustrated in FIG. 9, while lower-order bit input value outD[7:3] corresponds to pixel positions P2 to P4 and P6, output signal GCLK of clock gating control circuit 404 is "0." That is, the supply of clock signal CLK to higher-order bit flip-flop circuit 401 is stopped.

Here, clock signal CLK is always supplied to lower-order bit flip-flop circuit 402 in a segment in which at least control signal Vld is "1."

In the case of image data, in pixel data of each color component, there is a tendency that adjacent pixels are highly likely to match in the higher side bits and adjacent pixels are less likely to match in the lower side bits. In other words, in the pixel data of each color component, as compared with the values of the higher-order bits, the same value is less likely to continue in the lower-order bits.

Therefore, in the case of image data, even if clock gating is performed in the lower-order bits, it is very less likely to block the clock signal in most segments. Therefore, in the case of the image data, it can be said that the power consumption required for the operation of the comparison circuit is useless in most segments.

For this reason, as described above, in image processing circuit 100 according to the present embodiment, a comparison circuit and a clock gating control circuit are not provided for lower-order bit flip-flop circuit 402. That is, image processing circuit 100 according to the embodiment is designed not to perform clock gating in lower-order bit flip-flop circuit 402. Further, in image processing circuit 100, the comparison circuit and the clock gating control circuit are provided only for the higher side bits in which a lot of chances are expected to execute clock gating.

With this configuration, image processing circuit 100 can reduce an increase of power consumption in operation of the comparison circuit and perform pipeline processing on image data with reduced power consumption. Moreover, image processing circuit 100 can avoid an increase in circuit resources required for every pipeline register, as compared with a case where the comparison circuit and the clock gating control circuit are installed for lower-order bit flip-flop circuit 402.

Here, the optimum value of the number of higher-order bits (5 bits in the present embodiment) subject to clock gating control depends on the content and type of image data. In a case where pixel data of each color component is 8 bits, the present inventors have acquired an evaluation result that it is possible to acquire generally favorable results for various kinds of image data by setting any of bit numbers of higher-side 4 to 6 bits as a target of clock gating control.

Moreover, in a configuration in which the data path of each color component is independent as illustrated in FIG. 2, image processing circuit 100 may adopt a configuration in which the number of higher-order bits subject to clock gating control varies for every color component. That is, the bit range of image data of data to be input to a flip-flop circuit to which the comparison circuit and the clock gating control circuit are connected may vary for every color component.

For example, higher-side 5 bits are assumed as the target of clock gating control in first data path 201 of the Y component. Further, higher-side 6 bits are assumed as the object of clock gating control in second and third data paths 202 and 203 of the U component and the V component. Such a configuration is effective in a case where the width of a bit range (optimal bit width) in which the value is less likely to change tends to be larger in the U component and the V component than the Y component.

Thus, image processing circuit 100 enables a further reduction in power consumption by optimizing the bit range subject to clock gating control in each color component.

As described above, image processing circuit 100 according to the present embodiment has the image processor which performs pipeline processing on image data in synchronization with a clock signal. Further, the image processing includes control based on the image data on the supply of the clock signal to a higher-order n-bit register but does not perform such control on the supply of the clock signal to a lower 1-bit register. That is, the image processing according to the present embodiment does not require a comparison circuit and a clock gating control circuit for the lower 1-bit register.

With this configuration, image processing circuit 100 according to the present embodiment can perform pipeline processing on image data with reduced power consumption, and avoid an increase in circuit scale because of the reduction of the power consumption.

Here, it is assumed that image processing circuit 100 performs repetitive processing on a per pixel line basis of an image in the above-mentioned explanation, but the processing unit is not limited to pixel lines. For example, image processing circuit 100 may perform conversion processing in units of blocks (division areas) obtained by dividing the image into rectangle areas.

Moreover, image processing circuit 100 may provide a comparison circuit for every higher-order bit flip-flop circuit instead of collectively providing a single comparison circuit to multiple higher-order bit flip-flop circuits. However, as mentioned above, an increase in power consumption in comparison operation and an increase in circuit scale are further reduced when a single comparison circuit is collectively provided in image processing circuit 100.

Embodiment 2

Embodiment 2 of the present invention is an example of stopping the operation of a comparison circuit in a case where the operation of the comparison circuit is not necessary.

<Overall Configuration of Image Processing Circuit>

Figure 10:
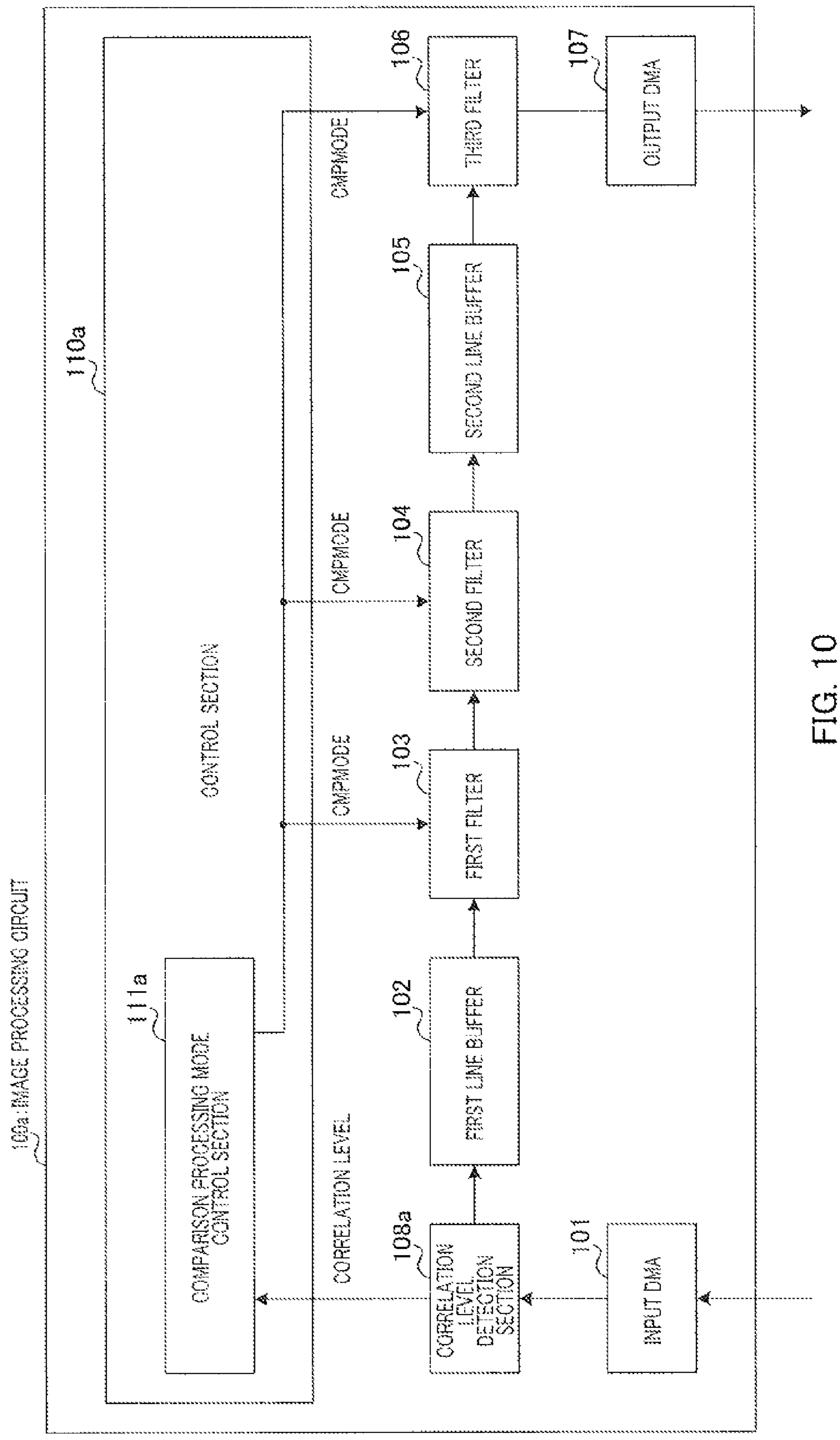
FIG. 10 is a configuration diagram illustrating an example of a configuration of an image processing circuit according to Embodiment 2 of the present invention.

FIG. 10 is a configuration diagram illustrating an example of the configuration of an image processing circuit according to the present embodiment, which corresponds to FIG. 1 in Embodiment 1. The same reference numerals are assigned to the same parts as those illustrated in FIG. 1 and explanation thereof is omitted.

In FIG. 10, in addition to the configuration illustrated in FIG. 1, image processing circuit 100*a* has correlation level detection section 108*a* disposed between input DMA 101 and first line buffers 102. Moreover, image processing circuit 100*a* has control section 110*a* including comparison processing mode control section 111*a*, in place of control section 110 in FIG. 1.

Correlation level detection section 108*a* acquires the correlation level indicating the matching frequency between adjacent pixels from image data. Here, the adjacent pixels are pixels adjacent in the horizontal direction among adjacent pixels in the input image in a case where the scanning direction of the image is the horizontal direction. To be more specific, correlation level detection section 108*a* receives line data to be output from input DMA 101, transfers the data to first line buffer 102 and extracts the correlation level from the line data at that time. Further, correlation level detection section 108*a* sequentially outputs the acquired correlation level to comparison processing mode control section 111*a*.

To be more specific, correlation level detection section 108*a* counts the number of parts at which the pixel values match between adjacent pixels on line data. For example, correlation level detection section 108*a* totals the count value using a pixel line, a frame or a division area resulting from division of the frame into rectangles, as a unit. Further, correlation level detection section 108*a* calculates the frequency at which the pixel values match between adjacent pixels on the line data (hereinafter referred to as "matching frequency"). For example, such matching frequency is expressed by the number or percentage of pixels of which the pixel values match other adjacent pixels.

Here, the sampling interval of the measurement object of the matching frequency may be widely set like a four-pixel interval or an eight-pixel interval, for example. In this case, it is possible to reduce a processing load.

Moreover, since only the higher-order bits of pixel data become the object of clock gating control, it is desirable that correlation level detection section 108*a* calculates the matching frequency only from the data of the higher-order bits. By this means, not only the reduction in the processing load and the increase in the processing speed but also appropriate determination of clock gating control can be realized.

Further, correlation level detection section 108*a* outputs the measured matching frequency to comparison processing mode control section 111*a* as a correlation level of the area in which the matching frequency is measured.

Comparison processing mode control section 111*a* stops the operation of comparison circuits of first to third filters 103, 104 and 106 in a segment in which the correlation level is low.

To be more specific, comparison processing mode control section 111*a* holds the correlation level input from correlation level detection section 108*a*. Further, in a case where the held correlation level is equal to or greater than a predefined threshold, comparison processing mode control section 111*a* decides a comparison processing mode to be a mode to perform comparison operation (ON). That is, this is a case where there are comparatively many chances to perform clock gating and the significance of the comparison operation is high.

Moreover, in a case where the held correlation level is less than the predefined threshold, comparison processing mode control section 111*a* decides the comparison processing mode to be a mode not to perform the comparison operation (OFF). That is, this is a case where there are comparatively few chances to perform clock gating and the significance of the comparison operation is low.

Further, comparison processing mode control section 111*a* controls first to third filters 103, 104 and 106 such that the decided comparison processing mode is realized.

For example, in a case where the matching frequency measurement by correlation level detection section 108*a* is performed on a per pixel line basis, comparison processing mode control section 111*a* decides the comparison processing mode for every line data. Moreover, in comparison processing mode control section 111*a*, when line data of a pixel line in which the matching frequency based on the decision is measured is processed by first to third filters 103, 104 and 106, the decided comparison processing mode is realized.

Here, image data to be input to second filter 104 and third filter 106 is image data processed in the first filter. Therefore, there is a case where the tendency of the matching frequency measured in correlation level detection section 108*a* depending on the processing content cannot be applied to such image data.

In a case where the tendency of the matching frequency cannot be applied, for example, image processing circuit 100*a* may have a configuration in which the control targets of the comparison processing mode by comparison processing mode control section 111*a* exclude second filter 104 and third filter 106. Alternatively, image processing circuit 100*a* may have a configuration in which a correlation level detection section with respect to third filter 106 is separately added between second filter 104 and the second line buffers 105.

Moreover, the present embodiment assumes a case where line data of four lines is input from first line buffer 102 for line processing in first filter 103. In this case, it is conceivable to perform a control to turn OFF the comparison processing mode in a case where the average value of the matching frequencies of input four-line data measured beforehand in correlation level detection section 108*a* is lower than a set threshold, and a control to turn ON the comparison processing mode in a case where it is equal to or greater than the threshold.

Similar to Embodiment 1, the pipeline registers of first to third filters 103, 104 and 106 are provided for every higher-order bit flip-flop circuit. However, the comparison circuit receives an input of a control signal (CmpMode) and switches ON/OFF of comparison operation according to the signal. Above-mentioned comparison processing mode control section 111*a* controls the comparison processing modes of first to third filters 103, 104 and 106 by inputting this control signal (CmpMode) in each comparison circuit.

In the present embodiment, in a case where the comparison processing mode is turned off, comparison processing mode control section 111*a* outputs a control signal (CmpMode) of 0. Further, in a case where the comparison processing mode is turned on, comparison processing mode control section 111*a* outputs a control signal (CmpMode) of "1."

<Configuration of Pipeline Register>

Figure 11:
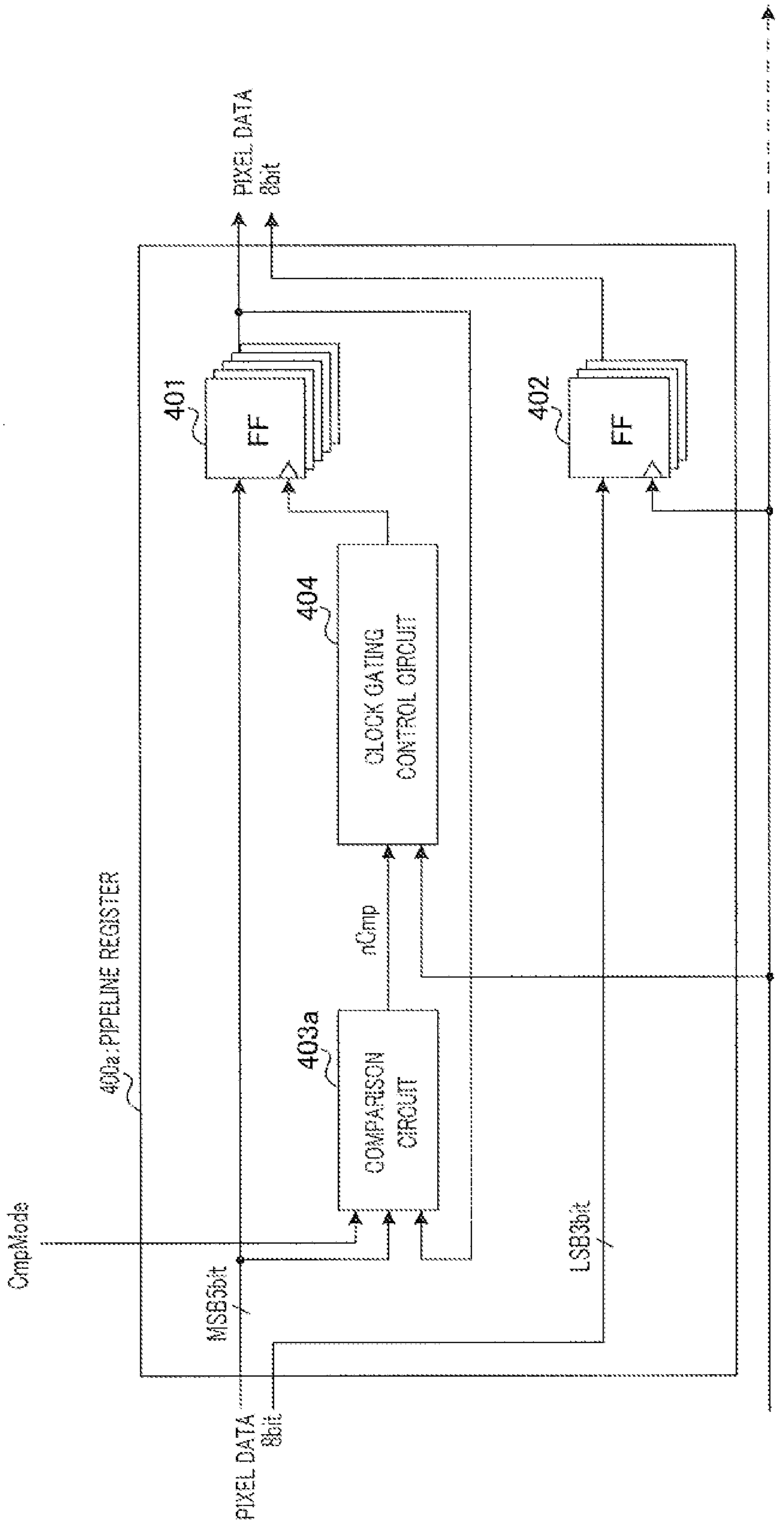
FIG. 11 is a circuit configuration diagram illustrating an example of a configuration of a pipeline register according to Embodiment 2.

FIG. 11 is a circuit configuration diagram illustrating an example of the configuration of a pipeline register according to the present embodiment, which corresponds to FIG. 5 in Embodiment 1. The same reference numerals are assigned to the same parts as FIG. 5 and the explanation thereof is omitted.

As illustrated in FIG. 11, pipeline register 400*a* according to the present embodiment has comparison circuit 403*a* in place of comparison circuit 403 in FIG. 5. Comparison circuit 403*a* switches ON/OFF of comparison operation according to a control signal (CmpMode) to be received from comparison processing mode control section 111*a*.

<Configuration of Comparison Circuit>

Figure 12:
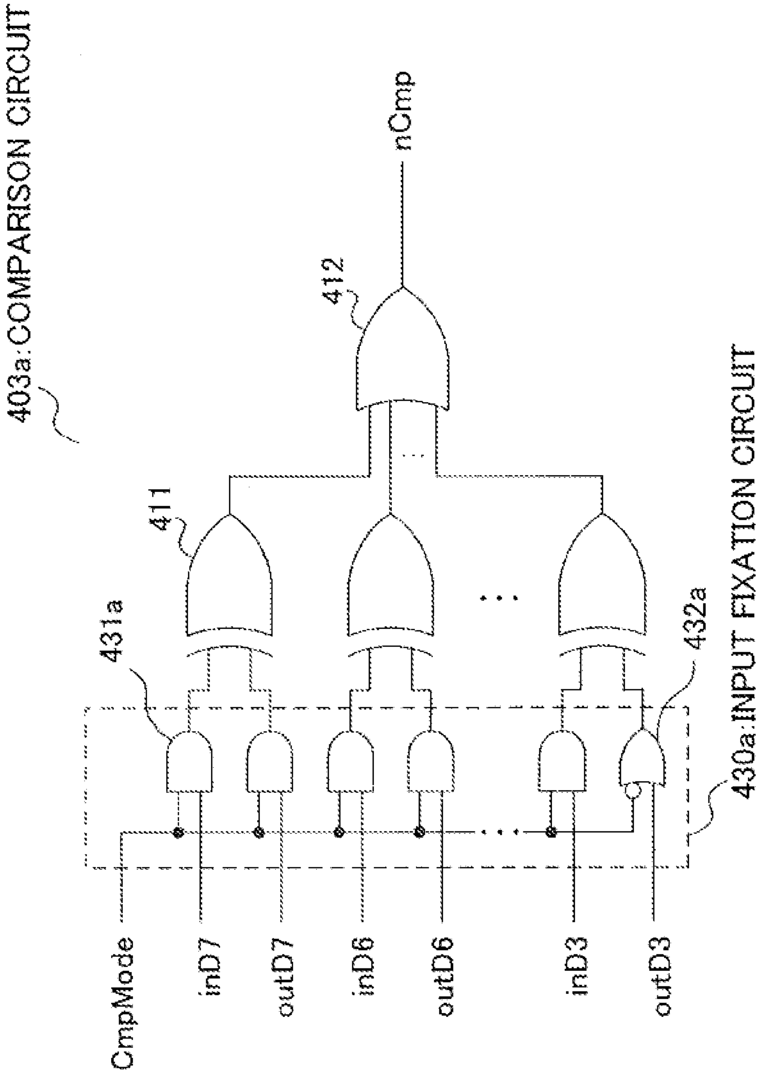
FIG. 12 is a circuit configuration diagram illustrating an example of a configuration of a comparison circuit according to Embodiment 2.

FIG. 12 is a circuit configuration diagram illustrating an example of the configuration of comparison circuit 403*a* according to the present embodiment, which corresponds to FIG. 6 in Embodiment 1. The same reference numerals are assigned to the same parts as FIG. 6 and the explanation thereof is omitted.

As illustrated in FIG. 12, comparison circuit 403*a* according to the present embodiment has input fixation circuit 430*a* on the input side of a group of EXOR gates 411. Input fixation circuit 430*a* is a gate that fixes the input signal values of the group of EXOR gates 411 by the control signal (CmpMode) from comparison processing mode control section 111*a*.

Input fixation circuit 430*a* has a configuration in which AND gates 431*a* each configured to find the logical product of the control signal (CmpMode) and a corresponding input signal except for higher-order bit output value outD3 are inserted. Here, the input signals except for higher-order bit output value outD3 are higher-order bit input values inD3 to inD7 and higher-order bit output values outD4 to outD7. Moreover, input fixation circuit 430*a* has a configuration in which OR gate 432*a* that finds the logical add of the control signal (CmpMode) for inverter gate insertion and higher-order bit output value outD3 is inserted.

In a case where the control signal (CmpMode) is "0," comparison circuit 403*a* having such input fixation circuit 430*a* fixes a signal after the group of EXOR gates 411 and sets the output signal (nCmp) to 1. As a result, the comparison result shows that they always mismatch, and a state where clock gating is not performed is applied.

When there is low frequency that the higher-order bit input value and the higher-order bit output value are the same, the power consumption in unnecessary comparison operation may exceed the power consumption in unnecessary flip-flop operation as a whole. Therefore, in image processing circuit 100*a*, by limiting the comparison operation in this way when it is necessary, it is possible to further reduce the power consumption.

Here, in a case where the control signal (CmpMode) is "1," similar to Embodiment 1, image processing circuit 100*a* performs a comparison operation of comparison circuit 403*a* and clock gating operation according to the comparison result.

As described above, image processing circuit 100*a* according to the present embodiment acquires the correlation level indicating the matching frequency between adjacent pixels from image data, and stops the comparison operation in a segment in which the correlation level is low. In other words, image processing circuit 100*a* measures the matching frequency beforehand in an image area of image data to be processed in the future, and turns off a comparison processing mode on the basis of the measured matching frequency.

That is, image processing circuit 100*a* adaptively excludes a period in which the matching frequency of the higher-side bits of the matching detection targets is low, from the targets of clock gating processing. In other words, image processing circuit 100*a* adaptively excludes a period in which there are few chances to perform clock gating and the power saving effect causes a negative effect, from the targets of clock gating processing.

By this means, image processing circuit 100*a* according to the present embodiment can further reduce the power consumption in pipeline processing on image data.

Here, the measurement of the matching frequency that is the correlation level may be performed outside image processing circuit 100*a*. In this case, image processing circuit 100*a* only has to receive the matching frequency from the outside.

Moreover, image processing circuit 100*a* may acquire the correlation level from information other than the matching frequency, such as the category of image data.

For example, with respect to image data of a category with a large percentage of a segment in which an image does not change such as a movie, image processing circuit 100*a* may determine that the correlation level is high on the basis of the category. Further, with respect to image data of a category with a small percentage of a segment in which an image does not change such as a shooting game, image processing circuit 100*a* may determine that the correlation level is low on the basis of the category.

Moreover, in a case where the measurement result of matching frequency is reflected to image data itself that is a measurement target, above-mentioned first line buffer 102 requires a capacity to store image data for the measurement unit of the matching frequency. Alternatively, in a case where the measurement is performed outside image processing circuit 100*a*, a processing delay may occur.

Therefore, image processing circuit 100*a* need not necessarily reflect the measurement result of the matching frequency to the image data itself that is the measurement target. That is, image processing circuit 100*a* may reflect the measurement result of the matching frequency to another subsequent image data.

In this case, for example, image processing circuit 100*a* controls a comparison processing mode on the basis of the matching frequency measured from the previous frame. That is, for example, in correlation level detection section 108*a*, image processing circuit 100*a* reuses the correlation level detected in other frames.

In the case of continuous images, there are few cases where the matching frequency greatly changes between temporally close frames (that is, the correlation between frames is high). Therefore, even in this case, image processing circuit 100*a* can realize the above-mentioned power saving while preventing the deterioration of image quality of an image acquired as a result of image processing.

Here, image processing circuit 100*a* may control the comparison processing mode on the basis of the matching frequency detected in a past frame earlier than the previous frame. However, the correlation of the matching frequency is higher between temporally closer frames. Therefore, in image processing circuit 100*a*, it is desirable to use the matching frequency detected in temporally closer frames.

Embodiment 3

Embodiment 3 of the present invention is an example where, by using the output of one comparison circuit for the other, the operation of the other comparison circuit is stopped between the left-eye image data and right-eye image data of a stereo image.

<Overall Configuration of Image Processing Circuit>

Figure 13:
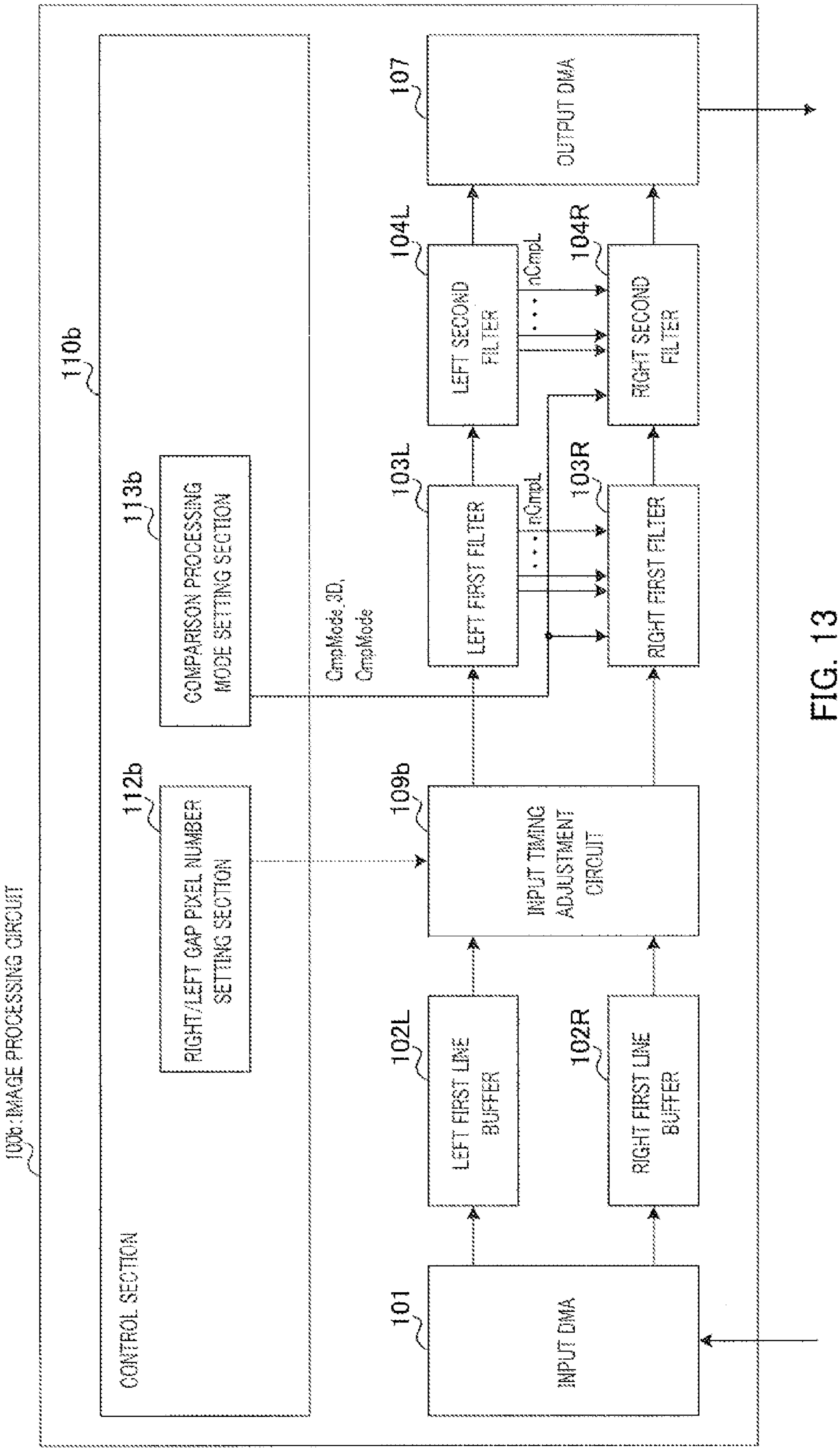
FIG. 13 is a configuration diagram illustrating an example of a configuration of an image processing circuit according to Embodiment 3 of the present invention.

FIG. 13 is a configuration diagram illustrating an example of the configuration of an image processing circuit according to the present embodiment, which corresponds to FIG. 1 in Embodiment 1. The same reference numerals are assigned to the same parts as FIG. 1 and the explanation thereof is omitted.

In FIG. 13, image processing circuit 100*b* according to the present embodiment receives left-eye image data and right-eye image data. The left-eye image data is data of the left-eye image (L image) of a stereo image (3D image). The right-eye image data is data of the right-eye image (R image) of the stereo image.

Image processing circuit 100*b* has two each of first line buffer 102, first filter 103 and second filter 104 in FIG. 1 for the left-eye image data and the right-eye image data. That is, image processing circuit 100*b* has an image processing section for the left-eye image and an image processing section for the right-eye image in parallel.

In the following, first line buffer 102, first filter 103 and second filter 104 for the left-eye image data are referred to as "left first line buffer 102L," "left first filter 103L" and "left second filter 1041," in this order. Left first filter 103L and left second filter 104L are a left-eye image processing section that performs pipeline processing on the left-eye image data having pixel data of N bits (N is an integer equal to or greater than two).

Moreover, first line buffer 102, first filter 103 and second filter 104 for the right-eye image data are referred to as "right first line buffer 102R," "right first filter 103R" and "right second filter 104R" in this order. Right first filter 103R and right second filter 104R are a right-eye image processing section that performs pipeline processing on the right-eye image data having pixel data of N bits (N is an integer equal to or greater than two).

Further, image processing circuit 100*b* has input timing adjustment circuit 109*b* on the way from left first line buffer 1021, and right first filter 103R to left first filter 1031, and right first filter 103R.

Moreover, image processing circuit 100*b* has control section 110*b* including right/left gap pixel number setting section 112*b* and comparison processing mode setting section 113*b*, in place of control section 110 in FIG. 1.

Here, second line buffer 105 and third filter 106 illustrated in FIG. 1 are not installed in the present embodiment, these may be installed for the left eye image and the right eye image.

Input timing adjustment circuit 109*b* adjusts at least one of the input timing of the left-eye image data to the left eye image processing section and the input timing of the right-eye image data to the right eye image processing section. To be more specific, input timing adjustment circuit 109*b* performs the above-mentioned adjustment such that the image processing in the left-eye image processing section and the image processing in the right-eye image processing section are simultaneously performed on a corresponding pixel pair between the left-eye image and the right-eye image. Input timing adjustment circuit 109*b* performs this adjustment for every predetermined image unit with reference to a pixel line, for example, for every line data or every frame.

Moreover, input timing adjustment circuit 109*b* performs this adjustment on the basis of the right/left gap pixel number which is described later and set by right/left gap pixel number setting section 112b. To be more specific, input timing adjustment circuit 109b adjusts the output timing of at least one of the left-eye image data and the right-eye image data by the right/left gap pixel number in a direction in which the right/left gap pixel number becomes zero in output data.

Right/left gap pixel number setting section 112b acquires the pixel number corresponding to the gap amount in the corresponding pixel pair between the left-eye image and the right-eye image in predetermined units of images. Further, right/left gap pixel number setting section 112b sets the acquired pixel number to input timing adjustment circuit 109b as a right/left gap pixel number. The corresponding pixel pair is a pair of pixels that display the same target between the left-eye image and the right-eye image, or a pair of pixels that are assumed to display the same target. In the corresponding pixel pair, there is a tendency that the matching/mismatching of pixel values in adjacent pixels is likely to be common.

To be more specific, for example, right/left gap pixel number setting section 112b calculates depth information of the left-eye image or the right-eye image in another processing. Further, right/left gap pixel number setting section 112b calculates the right/left gap pixel number from parameters of the intermediate processing result to be extracted at that time or from the depth information. Here, for example, right/left gap pixel number setting section 112b may calculate the right/left gap pixel number on the basis of parameters related to image generation such as the imaging conditions of the stereo image and the viewpoint distance and parallax that are generation conditions.

Comparison processing mode setting section 113b stops the operation of the comparison circuit of at least one of the left eye image processing section and the right eye image processing section. Further, comparison processing mode setting section 113b causes one clock gating control circuit to use the determination result of the other comparison circuit. That is, comparison processing mode setting section 113b also uses the determination result of the comparison circuit of one of the left-eye image processing section and the right-eye image processing section for the other filter. Further, after the determination result of the comparison circuit is designed to be used in the other filter, comparison processing mode setting section 113b does not operate the comparison circuit of the other filter (hereinafter referred to as "appropriation of comparison result").

To be more specific, comparison processing mode setting section 113b decides whether to divert the comparison result. Further, comparison processing mode setting section 113b outputs a mode signal (CmpMode_3D) showing the decision result to each pipeline register of the right-eye image processing section. The mode signal (CmpMode_3D) takes a value of 0 when the comparison result is not diverted, and takes a value of 1 when the comparison result is diverted. The mode signal (CmpMode_3D) is a common mode signal in each pipeline register of the right eye image processing section.

Further, comparison processing mode setting section 113b outputs the control signal (CmpMode) that switches ON/OFF of comparison operation, which is described in Embodiment 2. For example, the control signal (CmpMode) becomes "1" when the comparison result is not diverted, and becomes "0" when the comparison result is diverted.

Here, left first filter 103L and right first filter 103R have almost the same configuration. Moreover, left second filter 104L and right second filter 104R have almost the same configuration. In the following, expression "the other" is used for structurally symmetrical filters between left first filter 103L to left second filter 104L and right first filter 103R to right second filter 104R.

Moreover, expression "corresponding" is used for structurally symmetrical (same position) circuit parts between left first filter 103L to left second filter 104L and right first filter 103R to right second filter 104R.

However, the comparison circuit configuration varies between left first filter 1031, to left second filter 104L and right first filter 103R to right second filter 104R. Further, in image processing circuit 100b, the output result of each comparison circuit of left first filter 103L and left second filter 104L is connected to the comparison circuits corresponding to right first filter 103R and right second filter 104R.

Here, it is assumed that left first filter 1031, to left second filter 104L and right first filter 103R to right second filter 104R process image data of one line of the left-eye image and the right-eye image at the same time.

In the following, the common part in the configuration of each data path of left first filter 103L and left second filter 104L is expressed as "left data path 300bL." Moreover, the common part in the configuration of each data path of right first filter 103R and right second filter 104R is referred to as "right data path 300bR."

<Internal Configuration of Data Path>

Figure 14:
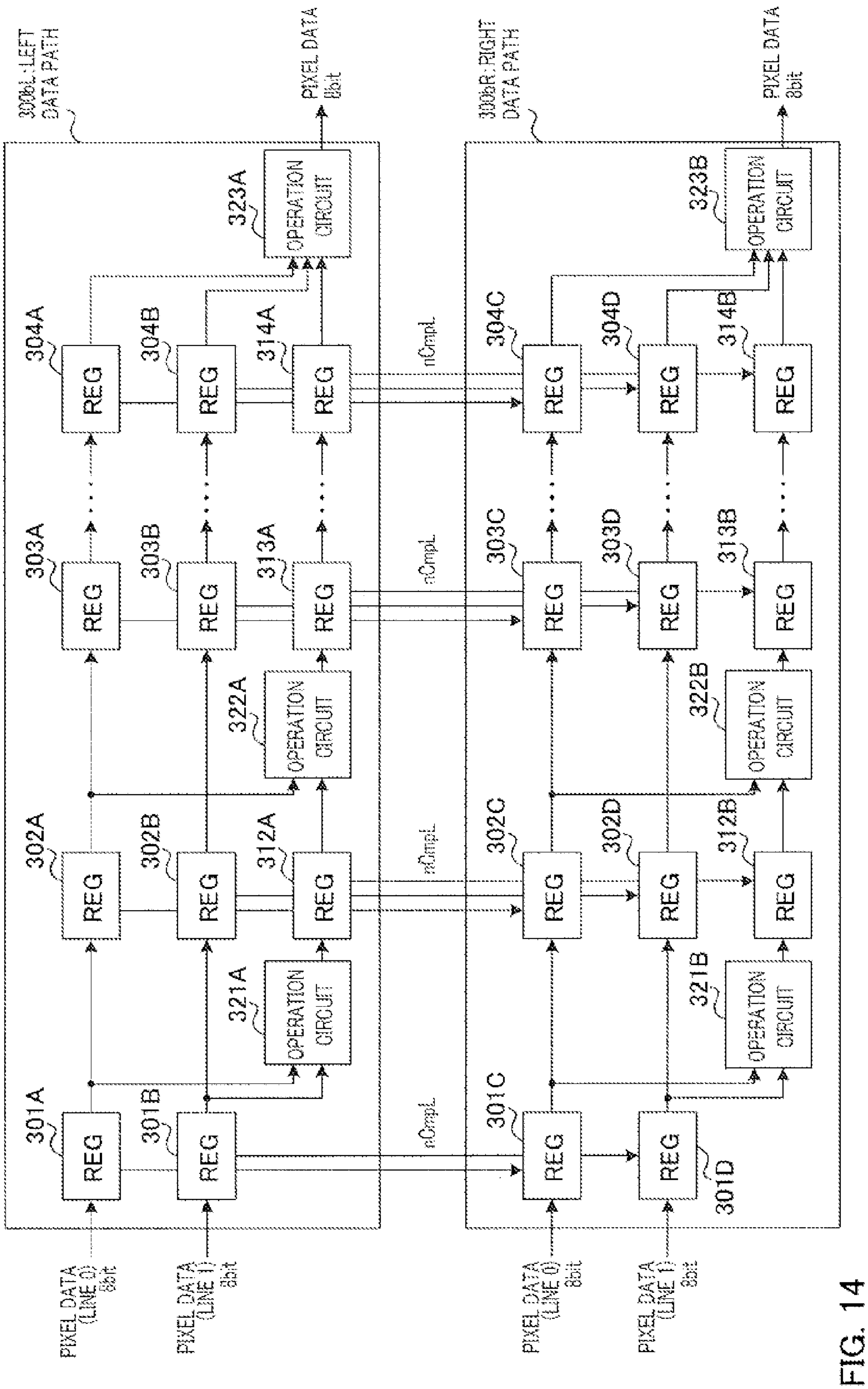
FIG. 14 is a circuit configuration diagram illustrating an example of a data path configuration according to Embodiment 3.

FIG. 14 is a circuit configuration diagram illustrating an example of the configurations of left data path 300bL and right data path 300bR, which corresponds to FIG. 4 in Embodiment 1. The same reference numerals are assigned to the same parts as FIG. 4 and the explanation thereof is omitted.

As illustrated in FIG. 14, output signals (nCmpL) from the comparison circuits of pipeline registers 301A to 314A of left data path 300bL are input in corresponding pipeline registers 301D to 314B of right data path 300bR.

The configuration of each of pipeline registers 301A to 314A of left data path 300bL can be assumed to be similar to Embodiment 1 or Embodiment 2. On the other hand, the configuration of each of pipeline registers 301D to 314B of right data path 300bR is different from Embodiment 1 and Embodiment 2 in the comparison circuit. In the following, the common part in the configurations of the comparison circuits in pipeline registers 301D to 314B of right data path 300bR is expressed as "comparison circuit 403b."

<Configuration of Comparison Circuit>

Figure 15:
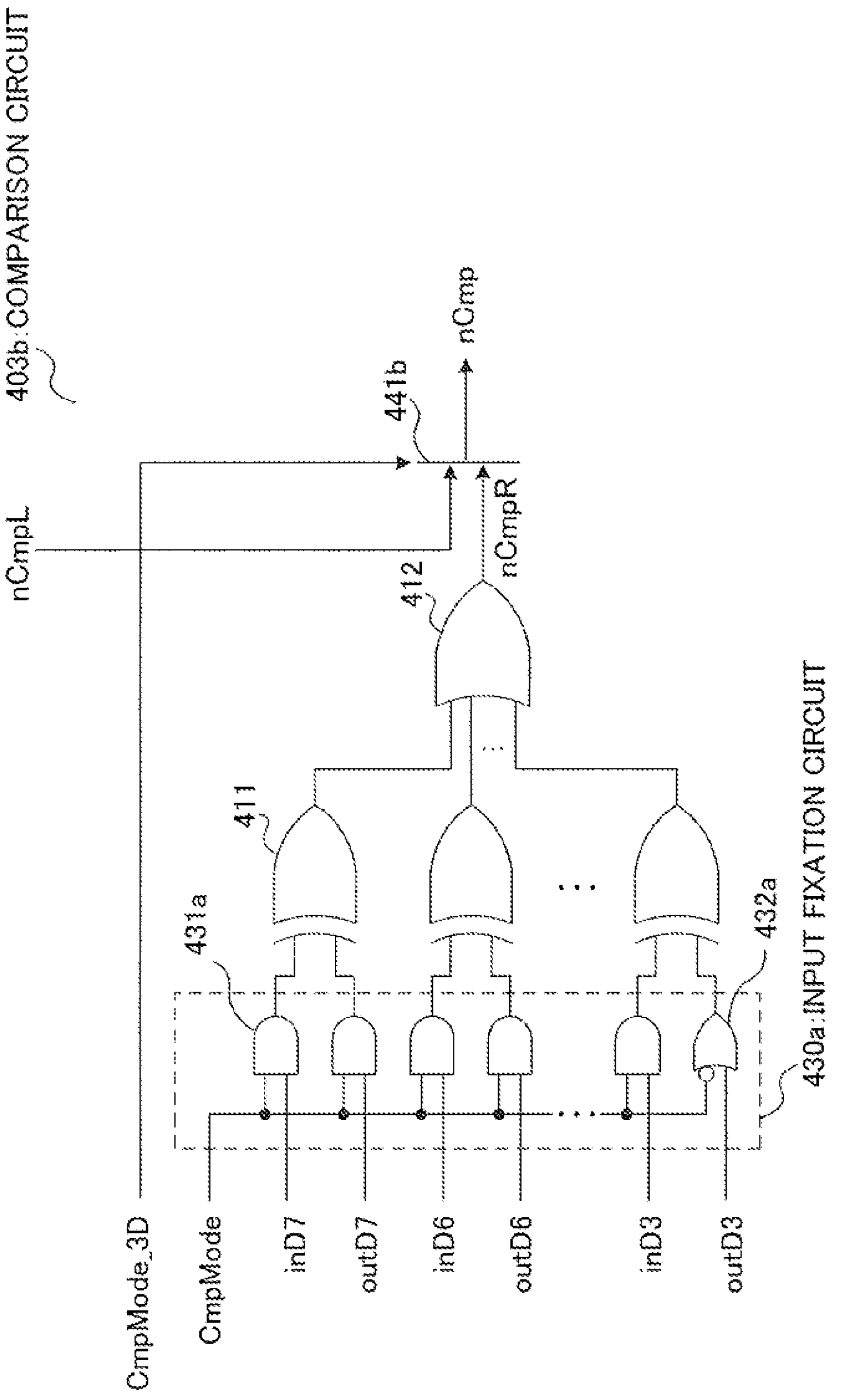
FIG. 15 is a circuit configuration diagram illustrating an example of a configuration of a comparison circuit according to Embodiment 3.

FIG. 15 is a circuit configuration diagram illustrating an example of the configuration of comparison circuit 403b, which corresponds to FIG. 6 in Embodiment 1 and FIG. 12 in Embodiment 2. The same reference numerals are assigned to the same parts as FIG. 6 and FIG. 12, and the explanation thereof is omitted.

As illustrated in FIG. 15, comparison circuit 403b has selector 441b on the output side of OR gate 412.

Selector 441b switches the output signal (nCmpR) of OR gate 412 and the output signal (nCmpL) from the comparison circuit corresponding to the other filter, and outputs it as an output signal (nCmp) to a clock gating control circuit on the subsequent stage. Selector 441b receives a mode signal (CmpMode_3D) from comparison processing mode setting section 113b as a selection signal and switches the output signal on the basis of this mode signal.

To be more specific, for example, when the mode signal (CmpMode_3D) is "0," selector 441b outputs the output signal (nCmpR) of OR gate 412. Moreover, when the mode signal (CmpMode_3D) is "1," selector 441*b* outputs the output signal (nCmpL) from the comparison circuit corresponding to the other filter.

Moreover, when the control signal (CmpMode) from comparison processing mode setting section 113*b* is "0," comparison circuit 403*b* fixes input signals of a group of EXOR gates 411 and OR gate 412 by input fixation circuit 430*a* of comparison circuit 403*b*. This is as described in Embodiment 2. As mentioned above, the control signal (CmpMode) becomes "0" when the mode signal (CmpMode_3D) becomes "1."

Therefore, when receiving control from comparison processing mode setting section 113*b*, comparison circuit 403*b* can stop its own operation by appropriating the determination result of the corresponding comparison circuit. On the other hand, pixel data of the corresponding pixel pair is input in two mutually corresponding comparison circuits at the same time by the function of input timing adjustment circuit 109*b*. Further, the pixel data of the corresponding pixel pair has a high correlation, and the matching/mismatching of pixel values in adjacent pixels is common at high probability.

Therefore, as compared with a case where the configuration described in Embodiment 1 or Embodiment 2 applies to image processing of a stereo image without any change, image processing circuit 100*b* can further reduce the number of operating comparison circuits. That is, even for image processing of the stereo image, image processing circuit 100*b* can avoid an increase in power consumption.

However, the actual right/left gap pixel number of the corresponding pixel pair is not necessarily constant depending on the image. Therefore, the matching/mismatching of pixel values in adjacent pixels of the corresponding pixel pair is not necessarily common. Therefore, in a case where the image processing timing is adjusted in units of pixel lines or units of frames, there is a case where the comparison result is diverted though the matching/mismatching of the pixel values in the adjacent pixels of the corresponding pixel pair is not correct. Then, in such case, as compared with a case where such appropriation is not performed, deterioration of a stereoscopic image to be acquired by image processing may be caused.

Therefore, based on whether the actual right/left gap pixel number of the corresponding pixel pair is constant, comparison processing mode setting section 113*b* may decide whether to divert the comparison result. Alternatively, based on whether the level at which the actual right/left gap pixel number of the corresponding pixel pair is not constant is allowable in a use case, comparison processing mode setting section 113*b* may decide whether to divert the comparison result. The use case in which the inconstant level is allowable is, for example, a case where low power consumption that allows image degradation is prioritized.

As described above, after adjusting the input timing of left-eye image data and right-eye image data to the image processing section, image processing circuit 100*b* according to the present embodiment diverts the result of the comparison circuit of the left image processing section as an output of the corresponding comparison circuit of the right image processing section. By this means, image processing circuit 100*b* can perform pipeline processing on image data of the stereo image with further reduced power consumption.

Here, in the present embodiment, image processing circuit 100*b* has a configuration in which the result of the comparison circuit of the left image processing section is diverted to the right image processing section, but an opposite configuration is also possible. That is, image processing circuit 100*b* may have a configuration in which the result of the comparison circuit of the right image processing section is diverted to the left image processing section.

Here, for example, a specific configuration of the image processing circuit such as the connection position and number of line buffers and the connection position and number of filters is not limited to the configurations described in the above-mentioned embodiments. Moreover, the image conversion processing performed in each filter is not limited to the processing described in each of the embodiments described above, and any image conversion processing can be employed as long as the processing is performed on line data in a pipelined manner. As a specific example of such image conversion processing, enlargement processing, reduction processing, feature amount extraction processing and color replacement processing can be cited.

As has been described above, the image processing circuit according to this disclosure includes: an input section that receives, as input, image data having pixel data of N bits (N is an integer equal to or greater than two); an image processing section that performs pipeline processing on the image data based on a clock signal; and an output section that outputs data acquired by the pipeline processing, in which the image processing section comprises a pipeline register, in which the pipeline register includes: a higher-order n-bit register that receives, as input, data of higher-order n-bits of held data; a lower-order 1-bit register that receives, as input, lower-order 1-bit data of the held data; a comparison circuit that determines whether an input value of the higher-order n-bit register and an output value of the higher-order n-bit register are identical; and a clock gating control circuit that controls supply of the clock signal to the higher-order n-bit register such that the clock signal is not supplied to the higher-order n-bit register when the comparison circuit determines that the input value and the output value are identical, in which the pipeline register comprises no circuit which controls the supply of the clock signal to the lower-order 1-bit register and holds image data or an operation result in the course of pipeline processing.

The image processing circuit may include: a correlation level detection section that acquires a correlation level indicating a matching frequency between adjacent pixels of the image from the image data; and a comparison processing mode control section that stops operation of the comparison circuit in a segment in which the correlation level is low.

In the image processing circuit, the correlation level detection section acquires the correlation level, using one frame forming the image or a division area resulting from division of the frame, as a unit.

In the image processing circuit, the correlation level detection section diverts the correlation level detected in another frame.

In the image processing circuit, the image data includes left-eye image data and right-eye image data of a stereo image, and the image processing section includes: a left-eye image processing section that performs the pipeline processing on the left-eye image data; and a right-eye image processing section that performs the pipeline processing on the right-eye image data, and the image processing circuit may further include: an input timing adjustment circuit that adjusts, for each pixel line, at least one of an input timing of the left-eye image data to the left-eye image processing section and an input timing of the right-eye image data to the right-eye image processing section such that the pipeline processing in the left-eye image processing section and the pipeline processing in the right-eye image processing section are performed on a corresponding pixel pair between the left-eye image and the right-eye image at a same time; and a comparison processing mode setting section that stops operation of the comparison circuit of at least one of the left-eye image processing section and the right-eye image processing section, and that causes the clock gating control circuit of the one image processing section to use a determination result of the comparison circuit of the other image processing section.

The image processing circuit may further include a plurality of the image processing sections provided for respective color components forming pixel data to be processed, in which pipeline registers included in the plurality of the image processing sections may have a different bit range of data to be input to the higher-order n-bit register.

A semiconductor integrated circuit according to this disclosure includes the image processing circuit.

The disclosure of Japanese Patent Application No. 2011-274303, filed on Dec. 15, 2011, including the specification, drawings and abstract, is incorporated herein by reference in its entirety.

INDUSTRIAL APPLICABILITY

The present invention is effective as an image processing circuit and semiconductor integrated circuit which can perform pipeline processing on image data in a state where the power consumption is reduced. That is, the present invention is suitable for a device having a function of performing conversion processing such as enlargement processing, reduction processing, deformation processing and image quality adjustment processing, on image data, and recording or displaying the processed image data. Especially, the present invention is suitable for portable devices such as a mobile phone, a tablet, a portable TV and a notebook PC, or stationary devices such as a digital TV, a DVD/BD recorder, a desktop PC and an in-vehicle navigation device.

REFERENCE SIGNS LIST

100, 100*a*, 100*b* Image processing circuit
101 Input DMA
102 First line buffer
102L Left first line buffer
102R Right first line buffer
103 First filter
103L Left first filter
103R Right first filter
104 Second filter
104L Left second filter
104R Right second filter
105 Second line buffer
106 Third filter
107 Output DMA
108*a* Correlation level detection section
109*b* Input timing adjustment circuit
110, 110*a*, 110*b* Control section
111*a* Comparison processing mode control section
112*b* Right/left gap pixel number setting section
113*b* Comparison processing mode setting section
200 Filter
201 First data path
202 Second data path
203 Third data path
204 Data path
300 Data path
300*b*L Left data path
300*b*R Right data path
301A to 314B Pipeline register
321 to 323, 321A to 323B Operation circuit
400, 400*a* Pipeline register
401 Higher-order bit flip-flop circuit
402 Lower-order bit flip-flop circuit
403, 403*a*, 403*b* Comparison circuit
404 Clock gating control circuit
430*a* Input fixation circuit
411 EXOR gate
412, 432*a* OR gate
421 Latch circuit
422, 431*a* AND gate
441*b* Selector

The invention claimed is:

1. An image processing circuit comprising:
an input section that receives, as input, image data having pixel data of N bits (N is an integer equal to or greater than two);
an image processing section that performs pipeline processing with respect to the image data based on a clock signal; and
an output section that outputs data acquired by the pipeline processing, wherein
the image processing section comprises:
a higher-order n-bit register that receives, as input, data of higher-order n-bits among the pixel data having the image data on which the pipeline processing is performed by the image processing section;
a lower-order 1-bit register that receives, as input, lower-order 1-bit data which is different from the data of higher-order n-bits among the pixel data;
a comparison circuit that inputs an input value of the higher-order n-bit register and an output value of the higher-order n-bit register among an input value and an output value for the higher-order n-bit register and the lower-order 1-bit register, and determines whether the input value of the higher-order n-bit register and the output value of the higher-order n-bit register are identical; and
a clock gating control circuit that controls supply of the clock signal to the higher-order n-bit register such that the clock signal is not supplied to the higher-order n-bit register when the comparison circuit determines that the input value and the output value are identical, and
a pipeline register that includes no circuit which controls the supply of the clock signal to the lower-order 1-bit register and holds image data or an operation result in the course of the pipeline processing,
the image processing circuit further comprising:
a correlation level detection section that acquires a correlation level indicating a matching frequency between adjacent pixels of the image from the image data; and
a comparison processing mode control section that stops operation of the comparison circuit in a segment in which the correlation level is low.

2. The image processing circuit according to claim 1, wherein the correlation level detection section acquires the correlation level, using one frame forming the image or a division area resulting from division of the frame, as a unit.

3. The image processing circuit according to claim 2, wherein the correlation level detection section diverts the correlation level detected in another frame.

4. An image processing circuit comprising:
an input section that receives, as input, image data having pixel data of N bits (N is an integer equal to or greater than two);

an image processing section that performs pipeline processing with respect to the image data based on a clock signal; and an output section that outputs data acquired by the pipeline processing, wherein the image processing section comprises:

a higher-order n-bit register that receives, as input, data of higher-order n-bits among the pixel data having the image data on which the pipeline processing is performed by the image processing section;

a lower-order 1-bit register that receives, as input, lower-order 1-bit data which is different from the data of higher-order n-bits among the pixel data;

a comparison circuit that inputs an input value of the higher-order n-bit register and an output value of the higher-order n-bit register among an input value and an output value for the higher-order n-bit register and the lower-order 1-bit register, and determines whether the input value of the higher-order n-bit register and the output value of the higher-order n-bit register are identical;

a clock gating control circuit that controls supply of the clock signal to the higher-order n-bit register such that the clock signal is not supplied to the higher-order n-bit register when the comparison circuit determines that the input value and the output value are identical; and a pipeline register that includes no circuit which controls the supply of the clock signal to the lower-order 1-bit register and holds image data or an operation result in the course of the pipeline processing, wherein the image data includes left-eye image data and right-eye image data of a stereo image, and the image processing section comprises:

a left-eye image processing section that performs the pipeline processing on the left-eye image data; and a right-eye image processing section that performs the pipeline processing on the right-eye image data, the image processing circuit further comprising:

an input timing adjustment circuit that adjusts, for each pixel line, at least one of an input timing of the left-eye image data to the left-eye image processing section and an input timing of the right-eye image data to the right-eye image processing section such that the pipeline processing in the left-eye image processing section and the pipeline processing in the right-eye image processing section are performed on a corresponding pixel pair between the left-eye image and the right-eye image at a same time; and a comparison processing mode setting section that stops operation of the comparison circuit of at least one of the left-eye image processing section and the right-eye image processing section, and that causes the clock gating control circuit of the one image processing section to use a determination result of the comparison circuit of the other image processing section.

5. The image processing circuit according to claim 1, further comprising a plurality of the image processing sections provided for respective color components forming pixel data to be processed, wherein pipeline registers included in the plurality of the image processing sections have a different bit range of data to be input to the higher-order n-bit register.

6. A semiconductor integrated circuit comprising the image processing circuit according to claim 1.

* * * * *